March 28, 1967  J. McGREGOR GORDON  3,311,277
VEHICLE LUGGAGE CARRIER

Filed Aug. 25, 1965  2 Sheets-Sheet 1

John McGregor Gordon
INVENTOR:

BY Bierman + Bierman

March 28, 1967 J. McGREGOR GORDON 3,311,277
VEHICLE LUGGAGE CARRIER

Filed Aug. 25, 1965 2 Sheets-Sheet 2

John McGregor Gordon
INVENTOR:
BY
Bierman + Bierman

United States Patent Office 3,311,277
Patented Mar. 28, 1967

3,311,277
VEHICLE LUGGAGE CARRIER
John McGregor Gordon, Nuthall, Nottingham, England, assignor to Raleigh Industries Limited, Nottingham, England
Filed Aug. 25, 1965, Ser. No. 482,352
Claims priority, application Great Britain, Sept. 4, 1964, 36,308/64
9 Claims. (Cl. 224—35)

The invention concerns a luggage carrier or like means of particular, though by no means exclusive, application to bicycles.

It is the primary object of the invention to provide a luggage carrier having means for releasably securing a basket or like structure thereto.

According to the present invention we provide a luggage carrier having means for releasably securing a basket or like structure thereto which includes a displaceable locking means in sliding engagement with a guide formation on the carrier and adapted to receive and locate a co-operating means on the said basket or like structure.

The invention will now be described further by way of example only and with reference to the accompanying drawings in which.

Figure 1:
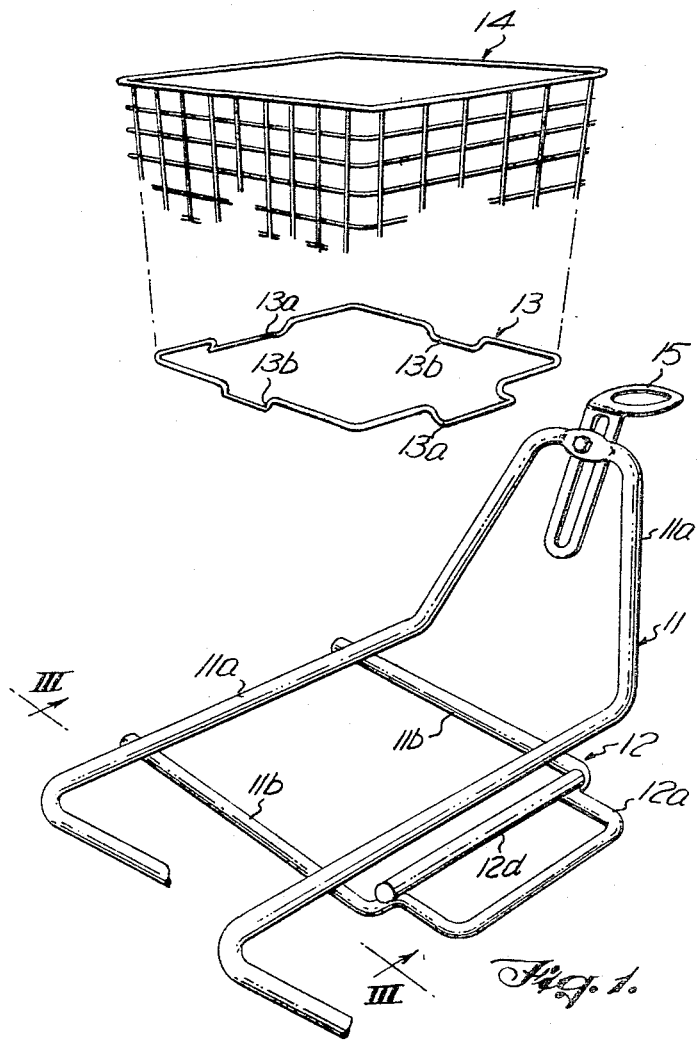
FIG. 1 is an exploded perspective view of a carrier/basket assembly constructed in accordance with the invention, part of the basket being omitted for the sake of clarity.
Figure 2:
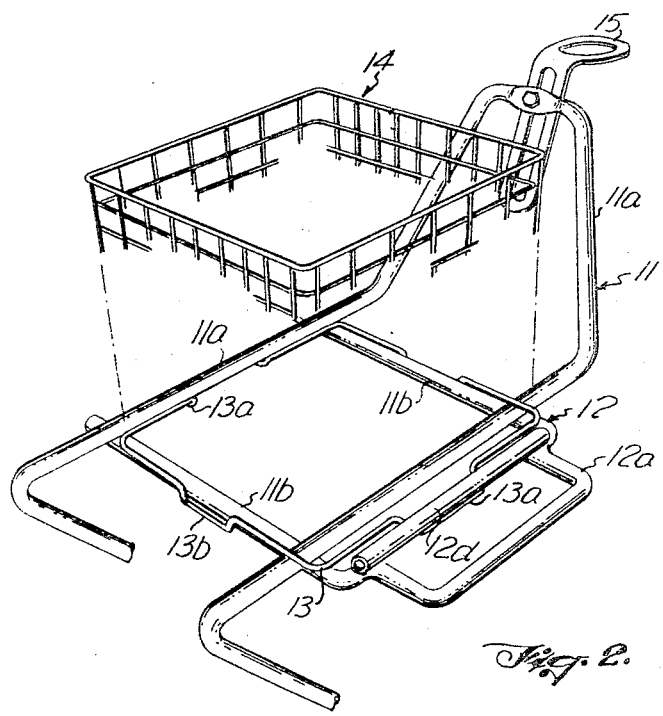
FIG. 2 is a perspective view of the arrangement shown in FIG. 1, the basket being in position upon the carrier.
Figure 3:
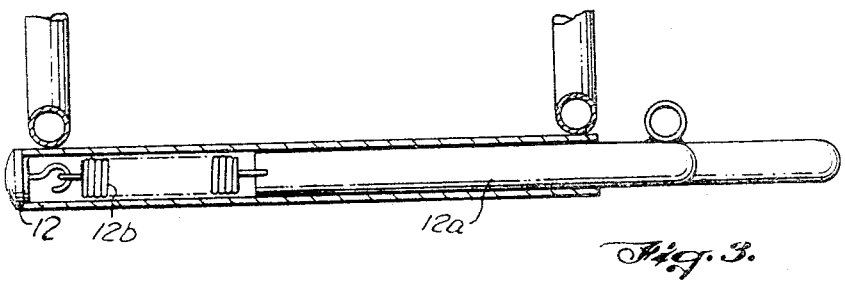
FIG. 3 is a section on line III—III.

A carrier/basket assembly constructed in accordance with the invention comprises a rigid support structure 11 firmly secured in position upon the bicycle (not shown) and displaceable locking means 12 on such structure arranged to receive and retain a co-operating arrangement 13 secured to a basket 14.

The support structure 11 is of generally U-shape when viewed in plan and comprises two spaced side members 11a secured, at the one end, to the bicycle head tube (not shown) and, at the other end, to the respective limb of the wheel fork, and two spaced transverse members 11b, extending between the side members in the central region thereof.

Each side member 11a, when seen in side elevation, and in an operative position, is cranked, the central region being disposed substantially horizontally, the upper part extending rearwardly and upwardly and the lower part extending rearwardly and downwardly. The two side members are joined at their upper ends and a bracket 15 is provided to attach the upper end of the structure to the head tube. The transverse members 11b are tubular and, in addition to imparting a requisite degree of rigidity to the structure, define guides to receive the displaceable locking means 12 as will hereafter become apparent.

The locking means 12 comprises a generally U-shaped element 12a in sliding telescopic engagement with the transverse members 11b, a coil spring 12b being located within each transverse member and extending between the end of one limb of the element and a respective end cap 12c seated against the end of the member, such springs serving to urge the U-shaped element into engagement, with the transverse members. A bar 12d extends between the limbs of the U-shaped element in spaced parallel disposition relative to the base of such element. The basket 14 is of inverted truncated pyramidal form and the carrier engaging means 13 is secured to the underside thereof, such means comprising a generally square framework of wire of which the central regions of two opposed sides are displaced to give downwardly and then outwardly extending lips 13a for engagement with the carrier. The central regions of the other two sides are also downwardly displaced by an amount corresponding to the downward displacement of the other deformities thus to form steps 13b, the steps 13b together with the lips 13a forming a stable base on which the basket can stand.

In use the basket 14 is applied to the carrier by locating one lip 13a of the carrier engaging means 13 under one of the carrier side members 11a and the other lip in the space between the bar 12d and the adjacent side member 11a, the U-shaped element 12a having been moved outwardly of the transverse members against the restraint of the springs 12b. Upon release of the U-shaped element the bar overlies the lip and thus the basket is held in position. Forward or backward movement of the basket is prevented by virtue of the positioning of each of the steps, 13b at the outer side of and in abutment with the respective transverse member 11b.

The invention is not restricted to the particular features of the embodiment hereinbefore described since alternatives will readily present themselves to one skilled in the art. Thus, for example the carrier engaging means may take the form of a suitable shaped plate attached to the underside of the basket, whilst the displaceable locking means may be T-shaped and supported in a single transverse member.

In an alternative structure, not illustrated, the displaceable locking means moves longitudinally rather than transversely of the carrier, the cooperating parts on the carrier being correspondingly disposed.

What I claim is:

1. A luggage carrier having means for releasably securing a basket-like structure thereto which means includes a guide formation on the carrier, and a displaceable locking means in sliding engagement with the said guide formation, the said locking means being adapted to receive and locate a co-operating means on the basket-like structure, in which the displaceable locking means includes a part arranged in telescoping engagement with an element of the carrier and a spring means is provided which is arranged to urge the said part into an engaged position, the carrier having a transverse element thereto, and the said part is in telescoping engagement therewith the said displaceable locking means includes a bar located substantially in the plane of the support surface of the carrier, the said bar being adapted to co-operate with the said means on the basket-like structure.

2. A luggage carrier as claimed in claim 1 wherein the displaceable locking means comprises a U-shaped element arranged in telescoping engagement with co-operating members of the carrier.

3. A luggage carrier comprising a substantially horizontal polygonal frame defining an angular opening, a basket the bottom of which is mounted on the edges of said opening, means depending downwardly and outwardly from said bottom for retaining said basket thereon, said frame having a pair of spaced substantially parallel tubular sides, a substantially U-shaped locking means having the legs thereof telescoping into said tubular sides, spring means in said tubular sides attached to said legs adapted to retract said locking means into said tubular sides, said retaining means include a first lip engaging under said locking means, said frame having a pair of sides transverse to said tubular sides and means on the ends of said transverse sides adapted to anchor said carrier to a vehicle, and a second lip opposite said first lip engaging under one of said transverse sides.

4. A luggage carrier according to claim 3 in which depending steps from said bottom engage said tubular sides.

5. A luggage carrier according to claim 3 in which said locking means has a cross bar under which said first lip is engaged.

6. A luggage carrier according to claim 3 in which said locking means has an extension serving as a handle for manipulating the same.

7. A luggage carrier according to claim 3 in which one end of said transverse sides is provided with a bracket for attachment to a support.

8. A luggage carrier according to claim 3 in which one end of said transverse sides is provided with a bracket for attachment to a support, the other end having downward projections for engagement with said support.

9. A luggage carrier according to claim 3 in which depending steps from said bottom engage said tubular sides, said locking means has a cross bar under which said first lip is engaged, said locking means has an extension serving as a handle for manipulating the same, one end of said transverse sides is provided with a bracket for attachment to a support, and the other end having downward projections for engagement with said support.

References Cited by the Examiner

UNITED STATES PATENTS

| | | |
|---|---|---|
| 3,013,286 | 12/1961 | Barreca. |
| 3,145,402 | 8/1964 | Kaminski. |

FOREIGN PATENTS

| | | |
|---|---|---|
| 211,344 | 2/1924 | Great Britain. |
| 817,399 | 7/1929 | Great Britain. |
| 142,834 | 11/1953 | Sweden. |

GERALD M. FORLENZA, *Primary Examiner.*

F. E. WERNER, *Assistant Examiner.*